United States Patent [19]

Jewell

[11] Patent Number: 5,778,942
[45] Date of Patent: Jul. 14, 1998

[54] VEHICLE INCLUDING FREEZE STRESS RESISTANT FLUID CONDUCTING APPARATUSES

[75] Inventor: David E. Jewell, Golden, Colo.

[73] Assignee: Stanley Aviation Corporation, Aurora, Colo.

[21] Appl. No.: 829,364

[22] Filed: Mar. 31, 1997

Related U.S. Application Data

[63] Continuation-in-part of Ser. No. 673,568, Jul. 1, 1996.

[51] Int. Cl.[6] ................................................. F16L 9/127
[52] U.S. Cl. .......................... 138/178; 138/DIG. 3; 138/DIG. 7
[58] Field of Search ............................. 138/120, 140, 138/178, DIG. 3, DIG. 7

[56] References Cited

U.S. PATENT DOCUMENTS

| | | | |
|---|---|---|---|
| 2,728,356 | 12/1955 | Brinsmade et al. | 138/DIG. 3 |
| 2,736,720 | 2/1956 | Kidwell . | |
| 3,586,058 | 6/1971 | Ahrens et al. | 138/103 |
| 3,869,338 | 3/1975 | Kavesh . | |
| 3,911,962 | 10/1975 | Chomat et al. | 138/125 |
| 3,913,625 | 10/1975 | Gazda et al. | 138/140 |
| 3,990,479 | 11/1976 | Stine et al. | 138/DIG. 7 |
| 4,076,873 | 2/1978 | Shea | 138/129 |
| 4,093,004 | 6/1978 | Kile et al. | 138/137 |
| 4,553,568 | 11/1985 | Piccoli et al. | 138/125 |
| 4,773,448 | 9/1988 | Francis . | |
| 4,786,088 | 11/1988 | Ziu | 138/113 |
| 4,880,036 | 11/1989 | Kitami et al. . | |
| 5,062,456 | 11/1991 | Cooke et al. | 138/133 |
| 5,084,314 | 1/1992 | Igarashi et al. . | |
| 5,380,571 | 1/1995 | Ozawa et al. | 138/DIG. 7 |
| 5,403,121 | 4/1995 | Lanan . | |
| 5,404,915 | 4/1995 | Mügge et al. . | |
| 5,449,024 | 9/1995 | Röber et al. . | |
| 5,451,437 | 9/1995 | Insley et al. . | |
| 5,566,720 | 10/1996 | Cheney et al. | 138/140 |
| 5,639,528 | 6/1997 | Feit et al. | 138/DIG. 3 |
| 5,656,345 | 8/1997 | Strand et al. | 138/DIG. 1 |

*Primary Examiner*—Denise L. Ferensic
*Assistant Examiner*—James F. Hook
*Attorney, Agent, or Firm*—Fields and Johnson, P.C.

[57] ABSTRACT

An improved vehicle includes fluid conducting apparatuses such as tubing and fittings which make up a fluid conducting system installed on the vehicle. The material used to make the fluid conducting apparatuses satisfies a specified ratio between the modulus of elasticity and the yield strength of the material. When the fluid conducting apparatuses are filled with frozen water such that the internal volume of the apparatuses has expanded by 10%, if the material has a modulus of elasticity of less than 20.5 times the yield strength of the material, then the material will not yield but will return substantially to its original shape and dimensions when the stress of the frozen water is removed.

6 Claims, 3 Drawing Sheets

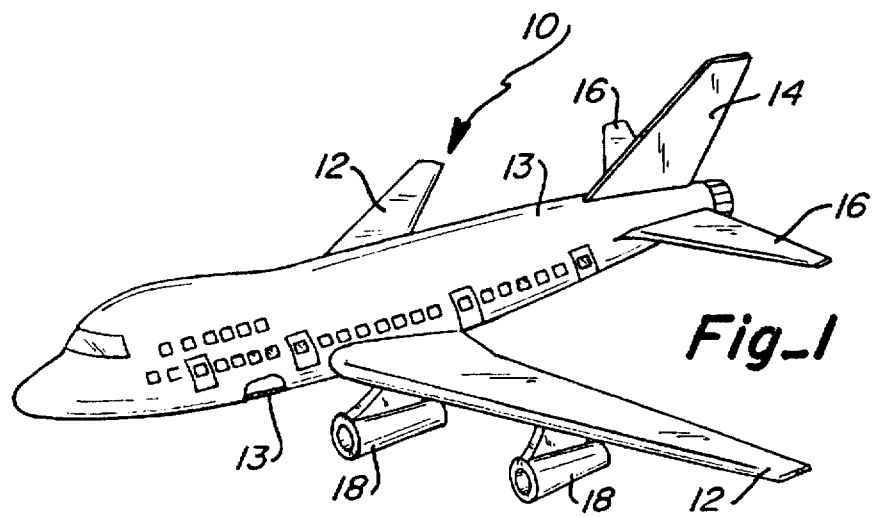
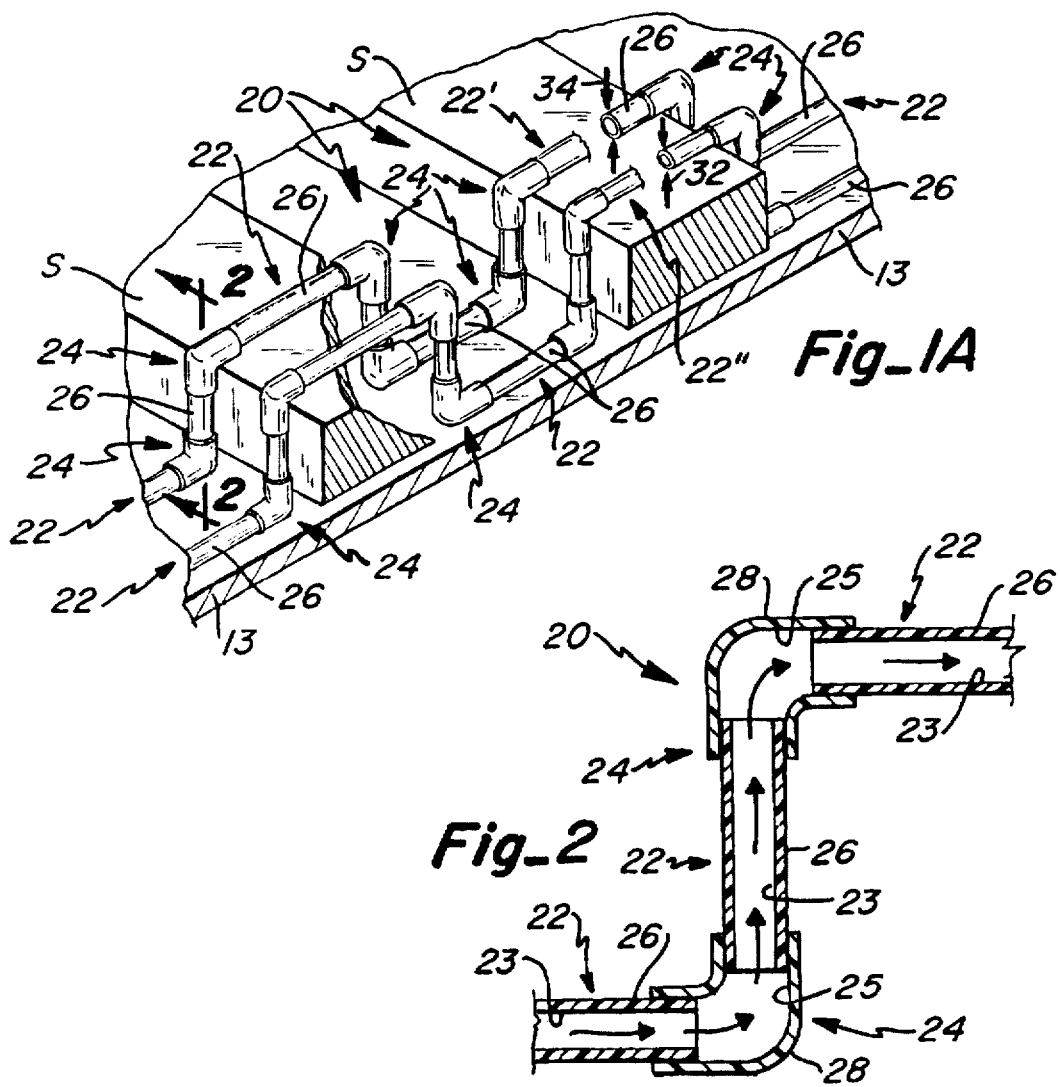

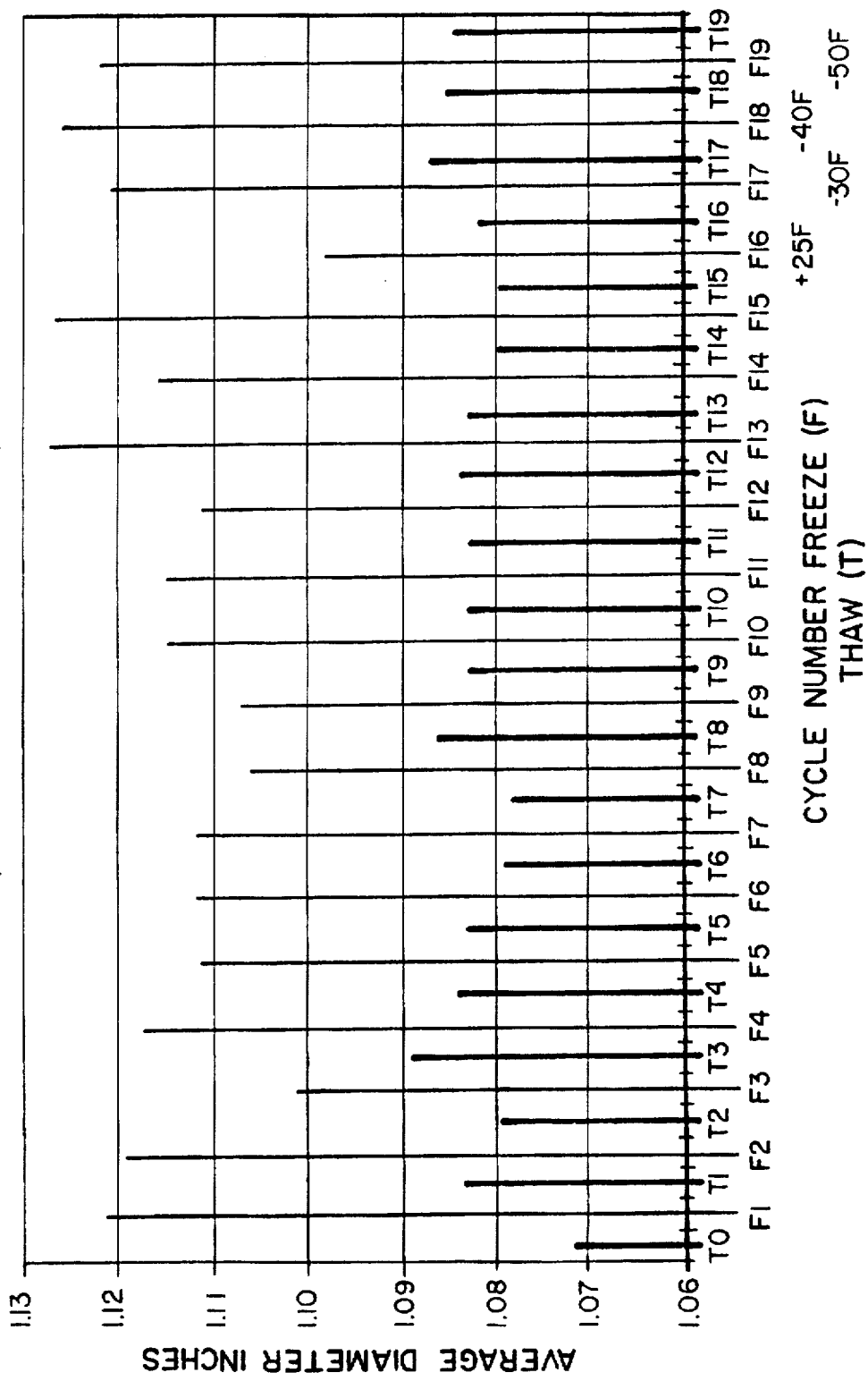

VEHICLE INCLUDING FREEZE STRESS RESISTANT FLUID CONDUCTING APPARATUSES

This invention is a continuation-in-part application of U.S. Ser. No. 08/673,568, filed Jul. 1, 1996, and entitled "Improved Vehicle Including Freeze Stress Resistant Fluid Conducting Apparatuses."

TECHNICAL FIELD

This invention relates to an improved vehicle including freeze stress resistant fluid conducting apparatuses which can withstand the stresses associated with freezing liquids and, more particularly, to tubing and fittings that are included within the piping or fluid conducting systems of aircraft or land vehicles such as railcars or wheeled vehicles.

BACKGROUND ART

Throughout many industrial applications, there are inherent problems associated with piping or tubing systems which contain a liquid which may be exposed to freezing temperatures. For liquid such as water, it is known that when the water freezes, it will expand 10% by volume. Because of this expansion, systems which carry such liquid may fail because of the stress produced by the expanding freezing liquid. Fluid conducting apparatuses such as tubing and fittings which are used in commercial and military vehicles may be exposed to numerous freeze/thaw cycles which can result in the creation of fractures in the apparatuses. Measures commonly used to prevent the freezing of such tubing or fittings include insulation, continuous flow of liquid through the exposed apparatuses and external measures to heat the apparatuses. Also, there are a number of prior art devices which may be made of a particular material or combination of materials wherein such materials are resistant to freezing to prevent the failure of the fluid conducting structures; however, these devices are not well suited for application in vehicles such as aircraft because they do not maintain a sufficiently rigid shape which, in turn, requires these devices to be supported by a complex system of hangers. Also, these devices are usually of multiple part construction which yields higher cost and weight.

U.S. Pat. No. 4,773,448 to Francis discloses a plastic pipe having a rigid outer shell and an inner shell of soft resilient plastic foam with a smooth central axial passageway therethrough adapted for passage of liquids. The material of the outer shell is a strong hard material, such as polyvinyl chloride, while the material of the inner shell is a soft foamable material such as foamed polyolefin. When the pipe of this invention is filled with water subjected to freezing conditions, the inner shell is expandable due to the foamlike material therein to accommodate the expansion of the liquid. However, the outer shell is not expandable and must be strong enough to withstand the pressure produced by the expanding freezing liquid which presses against the inner shell.

U.S. Pat. No. 5,449,024 to Rober, et al, teaches a multilayered pipe comprising at least one outer layer made of a polyamide and an inner layer which is made of a mixture of thermoplastic polyester and a mixture of an isocyanate compound. The multilayered pipe constructed according to this invention is resistant to both high and low temperatures, and other mechanical stresses.

U.S. Pat. No. 5,404,915 to Mügge, et al, teaches a multilayered plastic pipe having improved resistance to mechanical stress. The pipe of this invention includes an inner layer and an outer layer, each of which are composed of a polyamide-based molding composition, and at least one intermediate layer disposed between the inner and outer layers comprising a combination of crystalline polyester and a polymer containing a reactive group other than epoxide groups.

U.S. Pat. Nos. 3,869,338, 2,736,720, 5,084,314, and 4,880,036 all disclose flexible tubing or hose made from different materials which are suitable for conducting low temperature gases or liquids wherein the tubing or hose must maintain its flexibility and be resistant to the stresses induced on the tubing or hose by freezing temperatures.

While the foregoing inventions may be adequate for their intended purposes, each of the foregoing inventions have shortcomings which are overcome by the invention disclosed herein. More particularly, in the aircraft industry, there is a need to have structures such as tubing and fittings which are not only resistant to the stress of freezing water carried therein, but also structures which maintain a substantially rigid shape in temperatures well above freezing which enables the structures to be placed in confined spaces within the aircraft. Such structures maintain a rigid shape which enables them to be hung within small spaces within the aircraft and therefore such structures do not take up unnecessary space by requiring an excessive number of hangers for mounting the structures. Furthermore, it is desirable to have such structures which are lightweight and are not made of costly material.

Typically, many high performance aircraft include water piping systems which utilize stainless steel tubing. Stainless steel tubing is extremely strong in terms of its ability to withstand stresses, however, such stainless steel tubing will not withstand repeated freeze cycles. Even with the use of tubing made of titanium, such tubing will only survive four or five freeze cycles until the tubing fractures. In addition to the freeze cycle limitations of metal tubes, an even more serious problem may exist for a water system incorporating such metal tubing. Since the yield strength and stiffness of such metals is so high, an extremely high system pressure is created before the wall of the tubing yields. For example, a typical one-inch diameter stainless steel tube with a wall thickness of 0.020 inches will withstand 1400 pounds per square inch (psi) of internal pressure before its yield strength is exceeded, and a one-half inch diameter stainless steel tube with a wall thickness of 0.020 inches will develop 2800 psi in a system before yielding. These high pressures are enough to cause other system components within a water piping system to fail, such as couplers, flanges, interface connections, in a few freezing cycles, and many times on the first freezing cycle. While there exists numerous types of flexible hose which may have higher elasticity than metal tubing, the problem with this hose is that because of its flexibility, it is not well suited to be used in applications where there are tight spaces and where it is imperative that the hose does not sag or otherwise take up unnecessary space. Furthermore, while hoses available today may expand without damage during a freeze cycle, these hoses are not advantageous in many applications because they are generally expensive and are relatively heavy in comparison with standard stainless steel or titanium structures.

DISCLOSURE OF THE INVENTION

In accordance with this invention, an improved vehicle is provided which includes freeze stress resistant fluid conducting apparatuses comprising structures such as tubing and fittings. Each tube or fitting is made of a material that has a high yield strength and yet has a low modulus of elasticity, so that its yield strength will not be exceeded if subjected to freezing water contained therein and, therefore, the tubes or fittings will return substantially to their original shape after thawing since the elastic limit of the material is not exceeded. Also, since the apparatuses of this invention have a high modulus of elasticity relative to standard hoses, it enables the apparatuses to be used in applications where space is a prime consideration because the apparatuses will maintain a rigid shape in temperatures substantially above 32° F. Conversely, the modulus of elasticity is low enough so that a piping system made of the material will have a system pressure during freezing which is considerably less than that found in metal piping systems utilizing material such as stainless steel or titanium. Also, the materials making up the apparatuses of this invention are lightweight and inexpensive in comparison to metal tubing or available hose materials.

An additional advantage of the invention claimed herein is that the fluid conducting apparatuses can be made of the same type of material so that a system utilizing such tubing and fittings would have a uniform resistance to the ill effects of freezing cycles.

In instances where water is used as the conducted fluid in a piping or tubing system utilizing fluid conducting apparatuses, a theoretical basis exists for describing the required mechanical properties of the material to make the apparatuses. The two most relevant properties of the materials, namely yield strength and the modulus of elasticity, can be expressed in a relationship which defines the limits as to the type of materials that can be used to withstand the ill effects of a frozen liquid. In other words, a relationship may be derived between the yield strength of a material and its modulus of elasticity to determine a ratio which enables fluid conducting apparatuses made of such material to hold frozen water such that the apparatuses will not yield but will return to substantially their original shape even after a number of freeze-thaw cycles.

As will be explained in the Best Mode, the following describes the required ratio between the yield strength and modulus of elasticity: In a fluid conducting apparatus filled with frozen water such that its internal volume has expanded by 10%, if the apparatus is made of a material which has a modulus of elasticity of less than 20.5 times its yield strength when the modulus is measured at the yield stress and when the water becomes fully frozen, the material will not inelastically yield, but will return substantially to its original shape when the stress of the frozen water is removed.

Although the invention described herein may be particularly suited for aircraft, the invention may be equally advantageous for use in other vehicles such as commercial and military wheeled and tracked vehicles.

BRIEF DESCRIPTION OF THE DRAWINGS

FIG. 1 is a fragmentary perspective view of an improved vehicle of this invention in the form of an aircraft including the fluid conducting apparatuses.

FIG. 1A is an enlarged fragmentary perspective view of the improved vehicle of this invention as shown in FIG. 1 showing a portion of the piping system including the fluid conducting apparatuses;

FIG. 2 is a vertical section taken along line 2—2 of FIG. 1A illustrating a portion of the piping system including the fluid conducting apparatuses;

FIG. 4 is a graph illustrating testing data indicating the changes in the diameter of a length of tubing made in accordance with this invention that is subject to numerous freeze/thaw cycles.

BEST MODE FOR CARRYING OUT THE INVENTION

Figure 3:
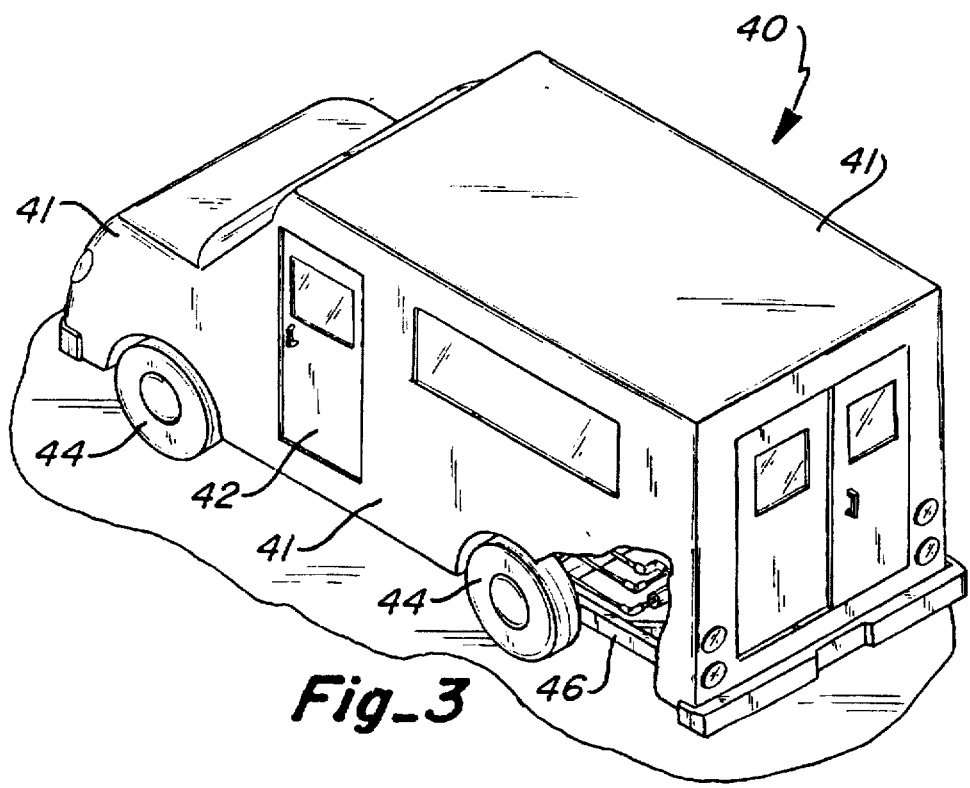
FIG. 3 is a fragmentary perspective view of an improved vehicle of this invention in the form of a wheeled vehicle including the fluid conducting apparatuses.
Figure 3A:
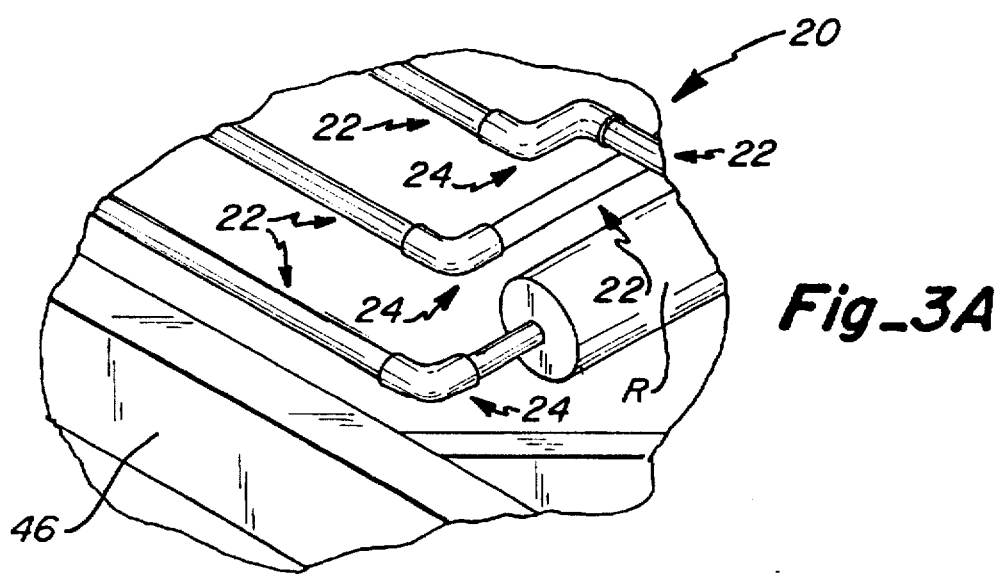
FIG. 3A is an enlarged fragmentary perspective view of the improved vehicle of this invention as shown in FIG. 3 showing a portion of the piping system including the fluid conducting apparatus.

In accordance with this invention, an improved vehicle including freeze-proof fluid conducting apparatuses is provided. As best seen in FIGS. 1 and 1A, when the vehicle takes the form of an aircraft, the vehicle 10 will include a pair of wings 12 interconnected by a fuselage 13, a tail portion 14 is formed at the rear portion of the fuselage. Stabilizers 16 are attached on each side of the rear end of the fuselage and extend perpendicularly to the tail 14. At least one jet engine 18 is attached to either the wings or fuselage for providing power to transport the aircraft. One example of an aircraft utilizing four jet engines is a Boeing 747. Although a jet aircraft is illustrated in FIG. 1, it will be understood that the claimed invention herein is not limited to a particular jet aircraft, but encompasses any aircraft such as fixed or rotary wing aircraft which have a piping system to convey liquids such as water or fuel.

As shown in FIG. 1A, a piping system 20 may be positioned within the interior of the fuselage 13 in order to conduct fluid such as water or fuel. As shown, the piping system 20 includes a plurality of lengths of tubing 22 interconnected by a corresponding plurality of fittings 24. The layout of the piping system 20 must be configured to fit between tight spaces adjacent to structural members S. That is, because of the small available spaces within the fuselage between the cargo or passenger areas and the exterior of the fuselage, the piping system 20 must be routed around and positioned between numerous structural members S or other pieces of aircraft hardware. Because of the small spaces, it is imperative that the piping system 20 have a rigid shape and require only a minimal number of hangers or connectors to stabilize the piping system 20.

As shown in FIG. 1A, the piping system typically has varying sizes of tubing 22 each having their own specific diameters and lengths. For example, tubing 22' has an external diameter defined by distance 34 and another piece of tubing 22" may have a differing external diameter shown as distance 32. The fluid conducting apparatuses are constructed of the same material and may be connected by an appropriate cement or glue or connected by other methods well known in the art. FIG. 2 illustrates a portion of the piping system wherein the tubing 22 and fittings 24 each include an outer surface 26 and 28, and an inner surface 23 and 25, respectively. The apparatuses have hollow interiors defined by inner surfaces 23 and 25 in which to carry or convey fluid such as water.

As shown in FIG. 3, when the vehicle of this invention takes the form of a land vehicle such as a wheeled vehicle, the vehicle 40 may include a body 41 having a passenger area 42 mounted on a vehicle frame 46. A plurality of wheels 44 enable the vehicle to roll along the ground wherein the wheels 44 are driven by a drive mechanism such as a combustion engine (not shown) drivenly linked to the wheels. As with the vehicle 10, a piping system 20 may be used in conjunction with the vehicle 40 in order to conduct fluid such as water or fuel. As shown in FIG. 4A, the piping system 20 could be used in order to conduct fluid wherein a reservoir R is provided to store the liquid. As shown, the piping system 20 includes the plurality of lengths of tubing 22 interconnected by the corresponding plurality of fittings 24. Although a particular wheeled vehicle is shown in FIG. 3, it will be understood that the claimed invention herein is not expressly limited to a particular wheeled vehicle, but also encompasses any land vehicles such as railcars, tracked vehicles or other wheeled vehicles such as trailers and the like.

A theoretical basis exists for describing the relationship between the yield strength and the modulus of elasticity for material making up the fluid conducting apparatuses so that the apparatuses are able to withstand the undesirable effects of a freezing liquid. By establishing a theoretical basis for the relationship, previous trial and error methods, such as individual material tests for each type of material in order to determine its suitability, are unnecessary. That is, by describing the special required relationship between the modulus of elasticity and the yield strength, the particular material used in accordance with this invention can be more readily obtained and verified as to its suitability. The following are the mathematical relationships which are used to derive the special relationship between the yield strength and modulus of elasticity, along with an example solution which follows from the mathematical relationships.

a. When water freezes, its volume expands almost exactly 10%.

$$\therefore \Delta V = 1.1 V1$$

Where:

$\Delta V$=total volume change of a tube carrying frozen water.

$V_1$=original volume of tube.

b. $\Delta V = \Delta V_d + \Delta V_a$

Where:

$\Delta V_d$=diametric volume change of the tube due to the freezing water.

$\Delta V_a$=axial volume change in a unit (1") length of the tube due to the freezing water.

c. From Roarke's *Handbook on Mechanical Engineering*, it is possible to define relationships for stress for a thin wall cylinder having capped ends:

$$\Delta R = \frac{PR^2}{Et} \left(1 - \frac{v}{2}\right); \epsilon_D = \frac{\Delta R}{R}$$

$$S_D = \frac{PD_1}{2t}$$

Where:

$\Delta R$=change in the tube radius due to internal pressure.

R=mean radius of the tube.

P=internal tube pressure

E=tensile modulus of elasticity.

t=wall thickness of the tube.

v=Poisson's Ratio of the material.*

$\epsilon_D$=diametric unit strain, (in/in).

$S_D$=diametric stress on the tube.

$D_1$=internal diameter of tube before freezing.

*The particular material used in freeze testing had a Poisson's Ratio of 0.45.

$$c_1. \quad \therefore \epsilon_D = \frac{PD_1}{2Et}\left(1 - \frac{.45}{2}\right) = \frac{.3875 PD_1}{Et}; \text{ or, } P = \frac{\epsilon_D Et}{.3875 D_1}$$

also from Roarke's:

$$\Delta L = \frac{PRL}{Et}(.5 - v); \epsilon_A = \frac{\Delta L}{L}$$

Where:

$\Delta L$=change in unit length of the tube due to internal pressure.

L=unit length of the tube,=1" (by definition).

$\epsilon_A$=axial unit strain, (in/in).

$$c_2. \quad \therefore \epsilon_A = \frac{PD_1}{2Et}(.5 - .45) = \frac{.025PD_1}{Et}; \text{ or, } \frac{PD_1}{Et} = 40\epsilon_A$$

$$\therefore \epsilon_D = .3875 \times 40\epsilon_A = 15.5\epsilon_A; \text{ or, } \epsilon_A = 6.4\% \epsilon_D$$

Since the axial strain is only 6.4% of the diametric strain, the axial strain is disregarded. The negligible effects of axial strain were verified by freeze testing wherein there was no measurable change in the length of the tubes when they were fully filled with water and frozen.

d. From a. & b. above, $\therefore \Delta V = \Delta V_d = 0.1 V_1 = V_2 - V_1$

Where:

$V_2$=volume of ice in the tube after freezing.

e. $V_2 = 1.1 V_1$

Also, $V_1 = \pi/4(D_1^2 L) = 0.785 D_1^2$ $V_2 = \pi/4(D_2^2 L) = 0.785 D_2^2$

Where:

$D_2$=inside diameter of tube after freezing.

$e_1. \therefore V_2 = 1.1 \times 0.785 D_1^2 = 0.8635 D_1^2$ f. $\therefore 0.785 D_2^2 = 0.8635 D_1^2$ $$D_2 = \sqrt{\frac{.8635 D_1^2}{.785}}$$

$f_1. D_2 = 1.0488 D_1$ $$g. \quad E = \frac{S_D}{\epsilon_D}$$

Where:

$S_D$=diametric stress placed on the tube.

$\epsilon_D$=diametric unit strain placed on the tube.

$$g_1. \quad \epsilon_D = \frac{D_2 - D_1}{D_1} = \frac{1.0488 D_1 - D_1}{D_1} = 1.0488 - 1 = .0488 \text{ in/in}$$

$$g_2. \quad \text{Since } E = \frac{S_D}{\epsilon_D}, E = \frac{S_D}{.0488} = 20.5 S_D$$

Conclusion: The unit strain in the diametric or circumferential direction due to water freezing within a fully filled tube is 0.0488 in/in, or 4.88%, regardless of tube material or dimensions. Therefore, if the tube material has a modulus of elasticity less than 20.5 times its yield strength when the modulus is measured at the yield stress and when the water becomes fully frozen, the tube will not elastically yield, but will return substantially to its original dimensions when the water thaws.

In practice, it was found that in addition to the requirement of the ratio between the modulus of elasticity and yield strength, it is necessary to have a material which has modulus of elasticity of at least 50,000 psi at 73° F. so that the material would be stiff enough to act as a rigid tube as opposed to flexible hose.

No known metals meet the above-described ratio between the modulus of elasticity and yield strength. Many thermoplastic elastomers meet the above criteria, as well as some other materials such as polybutylene and rubber modified Type 6 nylon. Included within the thermoplastic elastomer category is polyolefin, polyester, copolyester, block copolymers of butadiene/styrene/isoprene, amide block copolymers, silicone alloys and polyurethane. Additionally, many fluorinated polymers such as polyvinylidene fluoride and chlorotrifluoroethylene meet the above criteria, and also offer low flammabilitiy characteristics. One particularly advantageous material is a co-block polyester made by DUPONT® named HYTREL.

The listing and categorization of the foregoing materials can be found either in the *Modern Plastics* publication, mid-November 1996 edition, or an article entitled "Thermoplastic Fluoropolymers"© 1987, by Heidelore I. Rowan, E. I. Du Pont Nemours and Company, Inc. appearing in the 1993 edition of the *ASM, Engineering Plastics* publication, and by this reference are incorporated herein.

Testing of fully water filled HYTREL fluid conducting apparatuses has shown that the apparatuses can withstand at least twenty freeze cycles with insignificant undesirable effects.

Material such as HYTREL has a lower weight than even alloys such as titanium. HYTREL is approximately 27% the weight of titanium and approximately 15% the weight of stainless steel as measured on an equal volume basis. In a typical aircraft 1" water or drain tube, the wall thickness of a HYTREL tube must be 0.060" to meet the operating pressure requirements. Even at this thickness, the weight of the HYTREL tubing is 83% of typical titanium tubing and 45% of stainless steel. Furthermore, making tubing and fittings of material such as HYTREL is considerably less expensive than using stainless steel or titanium. The following is an example which calculates the total stress and strain experienced by fluid conducting apparatuses constructed of HYTREL.

1. Given a 1" diameter HYTREL tube having a 0.94" I.D. and a 1.06" O.D., the inside diameter of the tube after the tube has been fully filled with water, capped and frozen is:

From $f_1$, $D_2 = 1.0488 D_1 = 1.0488 \times 1.0 = 1.0488$"

2. The pressure developed in the above tube by freezing, assuming that the last water to freeze in the middle of the tube will do so when the tube is brought to a temperature of 10° F. is as follows:

The modulus of elasticity of a thermoplastic elastomer is a function of both temperature and stress level. The test data for a particular HYTREL grade indicates that, at 10° F. and 4.88% strain, the modulus is 88,000 psi.

From $c_1$, $$P = \frac{\epsilon_D E t}{.3875 D_1}$$

$$P = \frac{.0488 \times 88,000 \times .06}{.3875 \times 1.0} = 665 \, psi$$

3. The total wall strain and stress at freezing is as follows:
From $g_1$: The total wall strain is 0.0488 in/in, or 4.88%
From c:

$$S_D = \frac{PD_n}{2t} = \frac{665 \times .94}{2 \times .06} = 5209 \, psi$$

From known HYTREL test data, the yield strength at 10° F. is 7500 psi, so the tube will not yield but will return substantially to its original shape after it has thawed.

As illustrated in FIG. 4, freeze testing was conducted on 12 inch length sections of tubing constructed of a thermoplastic elastomer material. Before and after each freeze cycle, outer diameter measurements were taken on the tubing in a number of identical locations to record expansion after freeze as well as contraction after thawing. FIG. 4 shows nineteen consecutive freeze cycles in which the length of tubing did not yield, but remained within its elastic limit. The first fifteen freeze cycles were conducted at −15° F. Thereafter, the temperatures were further reduced to −30° F., −40° F. and −50° F. The measurements were taken at the indicated frozen condition temperature and at room temperature for the thawed condition. As illustrated, the expansion of the external diameter of the tube remained at a level which falls within the required ratio between the modulus of elasticity and yield strength of the material.

The foregoing invention provides an improved vehicle including freeze stress resistant fluid conducting apparatuses which withstand the adverse effects induced on the fluid conducting apparatuses when exposed to freezing conditions. Accordingly, the fluid conducting apparatuses may be utilized as rigid tubing and fittings which can be used in a number of vehicle applications. Furthermore, due to the relatively lightweight and inexpensive cost of utilizing thermoplastic elastomers and other qualifying materials, the invention disclosed herein is both economical and efficient. Particularly in the aircraft industry, the use of freeze stress resistant fluid conducting apparatuses enables a reduction in the weight of the aircraft, cost to manufacture piping systems, provides fluid conducting apparatuses which are rigid enough to be utilized in closely confined spaces, and prevents water damage of flight critical components by freeze damaged tubes.

This invention has been described in detail with reference to particular embodiments thereof, but it will be understood that various other modifications can be effected within the spirit and scope of this invention.

I claim:

1. An improved aircraft having a fuselage and at least one engine mounted to said aircraft, the improvement comprising:

a fluid conducting apparatus composed of a single homogeneous fluorinated polymer material attached to said aircraft, said apparatus having an outer surface, an inner surface, and a hollow interior defined by said inner surface, said material having a modulus of elasticity, yield strength, and yield stress wherein said modulus of elasticity is less than 20.5 times said yield strength when said modulus is measured at the yield stress whereby said fluid conducting apparatus can withstand multiple freeze cycles without failure.

2. An aircraft, as claimed in 1, wherein said material is composed of a fluorinated polymer selected from the group consisting of polyvinylidene and chlorotrifluoroethylene.

3. An improved land vehicle having a frame and a body mounted to said frame, the improvement comprising:

a fluid conducting apparatus composed of a single homogeneous fluorinated polymer material attached to said land vehicle, said apparatus having an outer surface, an inner surface, and a hollow interior defined by said inner surface, said material having a modulus of elasticity, a yield strength, and a yield stress wherein said modulus of elasticity is less than 20.5 times said yield strength when said modulus is measured at the yield stress whereby said fluid conducting apparatus can withstand multiple freeze cycles without failure.

4. A land vehicle, as claimed in 3, wherein said material is composed of a fluorinated polymer selected from the group consisting of polyvinylidene and chlorotrifluoroethylene.

5. A method of providing fluid conducting apparatuses for use in vehicles such as aircraft and/or land vehicles wherein the fluid conducting apparatuses are resistant to the stresses induced by frozen liquids carried within the apparatuses, said method comprising the steps of:

provided a single homogeneous fluorinated polymer material having a modulus of elasticity of less than 20.5 times its yield strength when measuring the modulus at the yield stress of the material;

forming the material into fluid conducting apparatuses such as tubing and fittings;

assembling the fluid conducting apparatuses to form a fluid conducting system;

installing the fluid conducting system on the vehicle for conveying and storing liquids such as water; and maintaining the fluid conducting system in a substantially rigid shape in temperatures above 32° F. and said fluid conducting apparatus can withstand multiple freeze cycles without failure.

6. A method, as claimed in claim 5, wherein said providing step provides a material composed of a fluorinated polymer selected from the group consisting of polyvinylidene and chlorotrifluoroethylene.

* * * * *